US008554753B1

(12) United States Patent
Bullock et al.

(10) Patent No.: US 8,554,753 B1
(45) Date of Patent: Oct. 8, 2013

(54) MAINTAINING DATABASE TRANSACTION PRIORITY BETWEEN WEB PAGES IN THE ABSENCE OF DIRECT COMMUNICATION BETWEEN THE PAGES

(75) Inventors: Nathan Bullock, Kitchener (CA); Matthew Bolohan, Waterloo (CA); David Edward Stewart, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/432,306

(22) Filed: Mar. 28, 2012

(51) Int. Cl.
*G06F 17/30* (2006.01)
*G06F 7/00* (2006.01)

(52) U.S. Cl.
USPC .......................................... 707/703

(58) Field of Classification Search
USPC .......................................... 707/703
See application file for complete search history.

(56) References Cited

U.S. PATENT DOCUMENTS

| 5,754,776 A | 5/1998 | Hales, II et al. |
| 6,526,462 B1 | 2/2003 | Elabd |
| 8,244,588 B1* | 8/2012 | Ahmed .................. 705/26.1 |
| 2002/0116248 A1* | 8/2002 | Amit et al. .................. 705/9 |
| 2008/0098044 A1* | 4/2008 | Todd ........................ 707/202 |
| 2009/0094332 A1 | 4/2009 | Schemers, III et al. |
| 2010/0235431 A1 | 9/2010 | Poluri et al. |
| 2011/0013516 A1 | 1/2011 | Black et al. |

OTHER PUBLICATIONS

A. Venkataramani, R. Kokku and M. Dahlin, "TCP Nice: A Mechanism for Background Transfers," ACM SIGOPS Operating Systems Review, 2002, http://www.cs.utexas.edu/users/dahlin/papers/nice.pdf, pp. 1-15.
Stephen Cleary, "It's All About the SynchronizationContext," MSDN Magazine, Feb. 2011, http://msdn.microsoft.com/en-us/magazine/gg598924.aspx, pp. 1-7.
Florentina I. Popovici, "Data-Driven Models in Storage System Design," Thesis, University of Wisconsin-Madison, 2007, http://research.cs.wisc.edu/adsl/Publications/popovici-thesis07.pdf, pp. 1-130.

* cited by examiner

*Primary Examiner* — Kuen Lu
(74) *Attorney, Agent, or Firm* — Birch, Stewart, Kolasch & Birch, LLP

(57) ABSTRACT

Systems and methods for managing database transactions communicated from a browser-based software application to a database by a database management system in order to avoid or ameliorate transaction latency. According to one embodiment, the system or method comprises foreground and background processes, each generating database transactions. The foreground processes can submit an unlimited number of transactions to the database while background processes can only submit a limited, predetermined number of transactions to the database. To accomplish this, the background processes are associated with an in-memory queue of transactions that are then submitted to the database in a quantity no greater than the predetermined number. As a result, the database transactions sent by the foreground process will not have to wait behind more than the predetermined number of background transactions, thereby resulting in lower latency and avoiding or ameliorating delays to the user.

22 Claims, 3 Drawing Sheets

MAINTAINING DATABASE TRANSACTION PRIORITY BETWEEN WEB PAGES IN THE ABSENCE OF DIRECT COMMUNICATION BETWEEN THE PAGES

The present specification relates to a database management system, and, more specifically, to a system and method for managing database transaction requests between web pages without direct communication between those web pages.

BACKGROUND

There exists a need to create, access, and process communications (e.g., email or SMS) even when a user does not have access to the Internet or other communications network. For example, many email applications now have "offline" capabilities made possible by synching the user's email account between the email service provider's server and a local database associated with a user, such as a computer, mobile phone, or other communications device. In this way, the user can access information synched to the local database even when the user is offline. This can include, for example, perusing the inbox, searching for archived emails, or drafting new emails. Once the user has regained a connection to the communications network, the user's modifications to her local database are uploaded to the email service provider's server.

Often, however, only one transaction can be executing on the user's local database at any one time. For example, while a user is reading an email from the local database (a "foreground process") the system may also attempt to write an email to the same database (a "background process"). Transactions from multiple processes can therefore result in delays to one or more of those processes. For example, a foreground process may have a transaction that is waiting in line behind twenty transactions previously submitted to the database by a background process. This can result in a perceivable delay that negatively impacts the user's experience.

Accordingly, there is a continued need for a method and system of processing database transaction requests from both foreground and background processes in a manner that avoids or prevents delays to the user.

SUMMARY OF THE INVENTION

Embodiments of the present invention comprise systems and methods for managing a plurality of database transactions from a software application to a database using a database management system. According to one embodiment, a method comprises the steps of: (i) receiving, at the database management system, database transactions from a first script of the software application; (ii) communicating, by the database management system, the database transactions from the first script to the database managed by the database management system; (iii) receiving, at the database management system, database transactions from a second script of the software application; (iv) storing the database transactions received from the second script; and (v) communicating, by the database management system, the stored database transactions to the database, wherein the stored database transactions are communicated by the database management system to the database in a quantity at or below a predetermined maximum number Yet another embodiment comprises a database management method for managing a plurality of database transactions from a browser-based software application to a local database, the method comprising: (i) receiving, at a database management system, database transactions from a foreground page of the browser-based software application; (ii) assigning a foreground priority to the database transactions from the foreground page; (iii) communicating, by the database management system, the database transactions from the foreground page to a database managed by the database management system; (iv) receiving, at the database management system, database transactions from a background page of the software application; (v) assigning a background priority to the database transactions from the background page, wherein the background priority depends on the foreground priority; (vi) storing the database transactions received from the background page in a local memory; and (vii) communicating, by the database management system, the stored database transactions to the database, wherein the stored database transactions are communicated by the database management system to the database in a quantity at or below a predetermined maximum number, and further wherein the predetermined maximum number of stored database transactions sent to the database depends on the assigned background priority such that the database transactions communicated from the foreground page to the database and the background page to the database form a first-in-first-out queue at the database.

In another implementation, a non-transitory computer-readable storage medium containing program code for receiving, at a database management system, database transactions from a first script of a software application; program code for communicating, by the database management system, the database transactions from the first script to a database managed by the database management system; program code for receiving, at the database management system, database transactions from a second script of the software application; program code for storing the database transactions received from the second script; and program code for communicating, by the database management system, the stored database transactions to the database, where the stored database transactions are communicated by the database management system to the database in a quantity at or below a predetermined maximum number, and further where the database transactions communicated from the first script to the database and the second script to the database form a first-in-first-out queue at the database.

In another implementation, a system for managing a plurality of database transactions from a software application to a database using a database management system includes: (i) a user computer; (ii) a software application comprising a first application process and a second application process; (iii) a database; (iv) a database management system that receives database transactions from both the first application process and the second application process, where the database management system communicates the database transactions from said first application process and the database transactions from said second application process to the database such that the second application process database transactions are communicated by the database management system to the database in a quantity at or below a predetermined maximum number.

The details of one or more embodiments are described below and in the accompanying drawings. Other objects and advantages of the present invention will in part be obvious, and in part appear hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTIONS

Embodiments of the present invention comprise systems and methods for managing transaction requests to a database. According to an example embodiment, foreground processes are allowed to submit an unlimited number of transactions to the database while background processes are allowed to submit a limited, predetermined number of transactions which must be completed before another limited, predetermined number of transactions can be submitted. As a result, the foreground process will not have to wait for more than the limited, predetermined number of background transactions, thereby resulting in lower latency and avoiding or ameliorating delays to the user. To accomplish this, the background processes can be associated with an in-memory queue of transactions that are submitted to the database in the predetermined number at a time.

According to another embodiment, the level of priority given to foreground and background processes can be adjusted by adjusting the number of transactions each process can be allowed to submit to the local database at any one time. For example, a process with a direct impact on user delays can be allowed to submit an unlimited number of transactions, while a process that only marginally affects user delays can be allowed to submit a limited number of transactions. In this way, the designer or user is able to easily designate the priority of any process by adjusting the number of transactions that process can submit to the database at once.

Another method of adjusting the priority given to foreground and background processes can be to limit the number of "read" transaction in a manner or number differently from limiting the number of "write" transactions. Alternatively, the method can limit the number of outstanding transactions that affect particular tables within the database, certain groups of rows in one or more tables of the database, or any combination of these and many other particular transactions.

Example Database Management Systems

Figure 1:
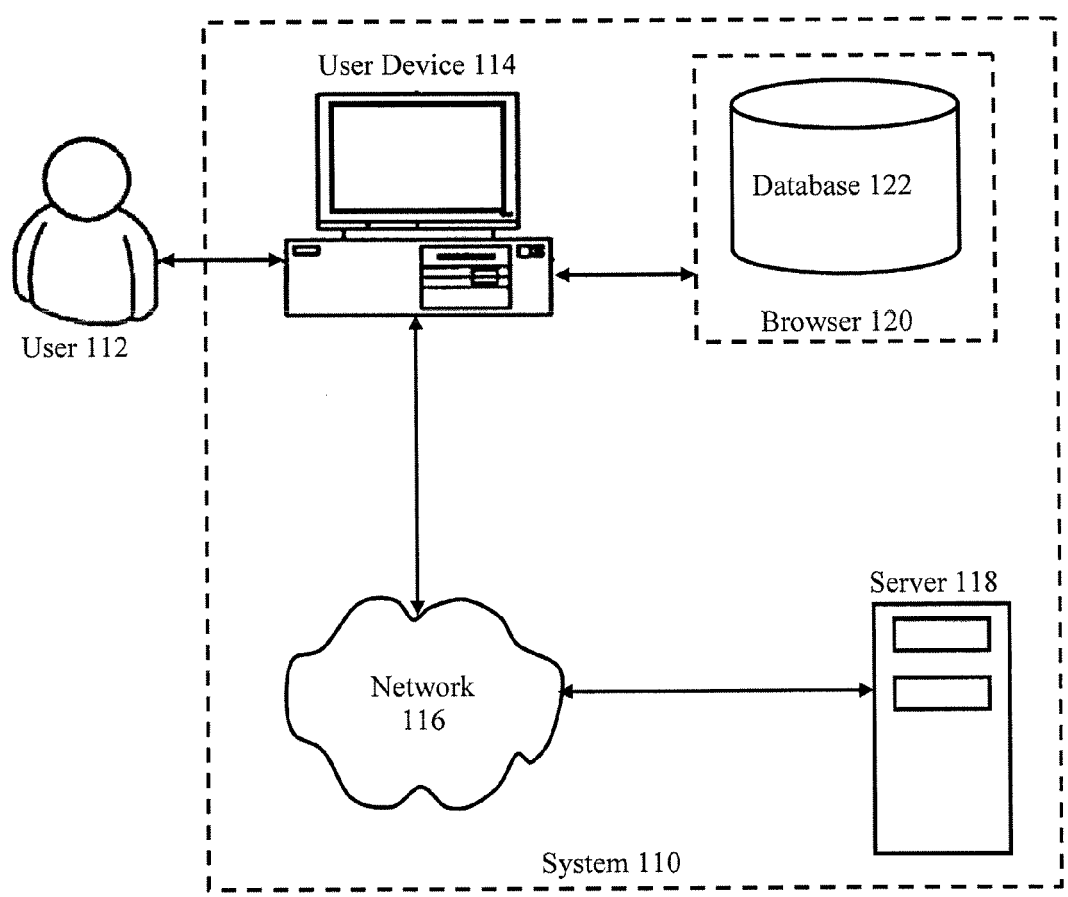
FIG. 1 is a diagram of an example database transaction management system in accordance with a example embodiment.

Referring now to the drawings, wherein like reference numerals refer to like parts throughout, there is seen in FIG. 1 a schematic drawing of a communication system 110 in which the database transaction management system operates, according to one embodiment of the method. System 110 comprises, for example, a network 116 that connects a user device 114 to a local or remote server 118. Network 116 can be any suitable wired or wireless network capable of transmitting communication, including but not limited to a telephone network, Internet, Intranet, local area network, Ethernet, online communication, offline communications, wireless communications and/or similar communications means. User device 114 is preferably any device capable of running, minoring, displaying, or otherwise interacting with software requiring multiple database transaction requests. This includes, but is not limited to, desktops, laptops, tablets, personal digital assistants, personal digital devices, cellular phones, mobile computers, netbooks, smartphones, pocket computers, and handheld computers, among many others. In other words, user device 114 can be any device comprising a processor and a network connection.

By way of example, user device 114 can comprise a software or program component such as a web browser 120. Browser 120 is designed to enable user 112 to access, retrieve, and view resources and documents, including resources and documents found on the Internet or an Intranet, among other sources. For example, the browser can be designed for viewing an Intranet within an organization, or any other connection of local computers. Browser 120 can comprise, for example, an extension that, when active, comprises both a visible UI (the foreground page) and an invisible page comprising the extension's logic (the background page). Both the foreground page and the background page can send transaction requests to the associated database 122, including requests such as reading and/or writing data, among others. Although database 122 is shown in the embodiment in FIG. 1 as being associated with browser 120 and therefore with user device 114, there is no requirement for this particular configuration. Database 122 can be located locally or remotely, and can be in wired or wireless communication.

System 110 may also comprise only user device 114 and software or program component 120 with database 122. In this system, the software or program component which is the web browser 120 in the embodiment described above is designed for viewing locally-stored files. In this embodiment, system 110 and the methods described herein are used to manage the local database without a network connection, or without accessing an available network connection.

Example Database Management Methods

Figure 2:
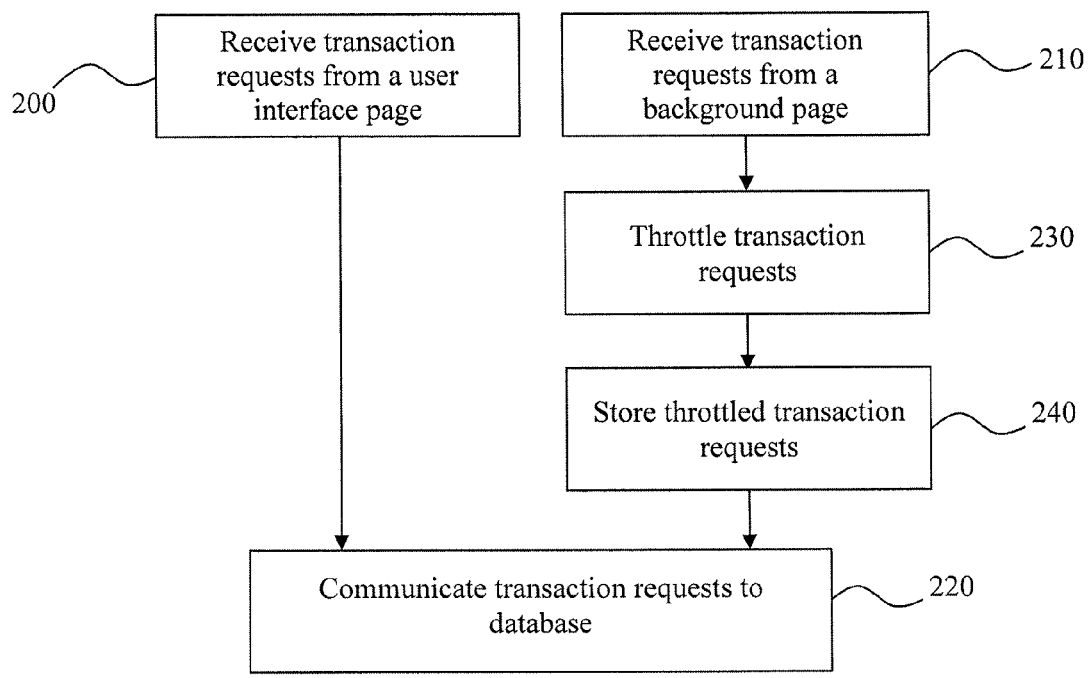
FIG. 2 is a flow chart of an example process for operating a database transaction management system in accordance with an example embodiment.
Figure 3:
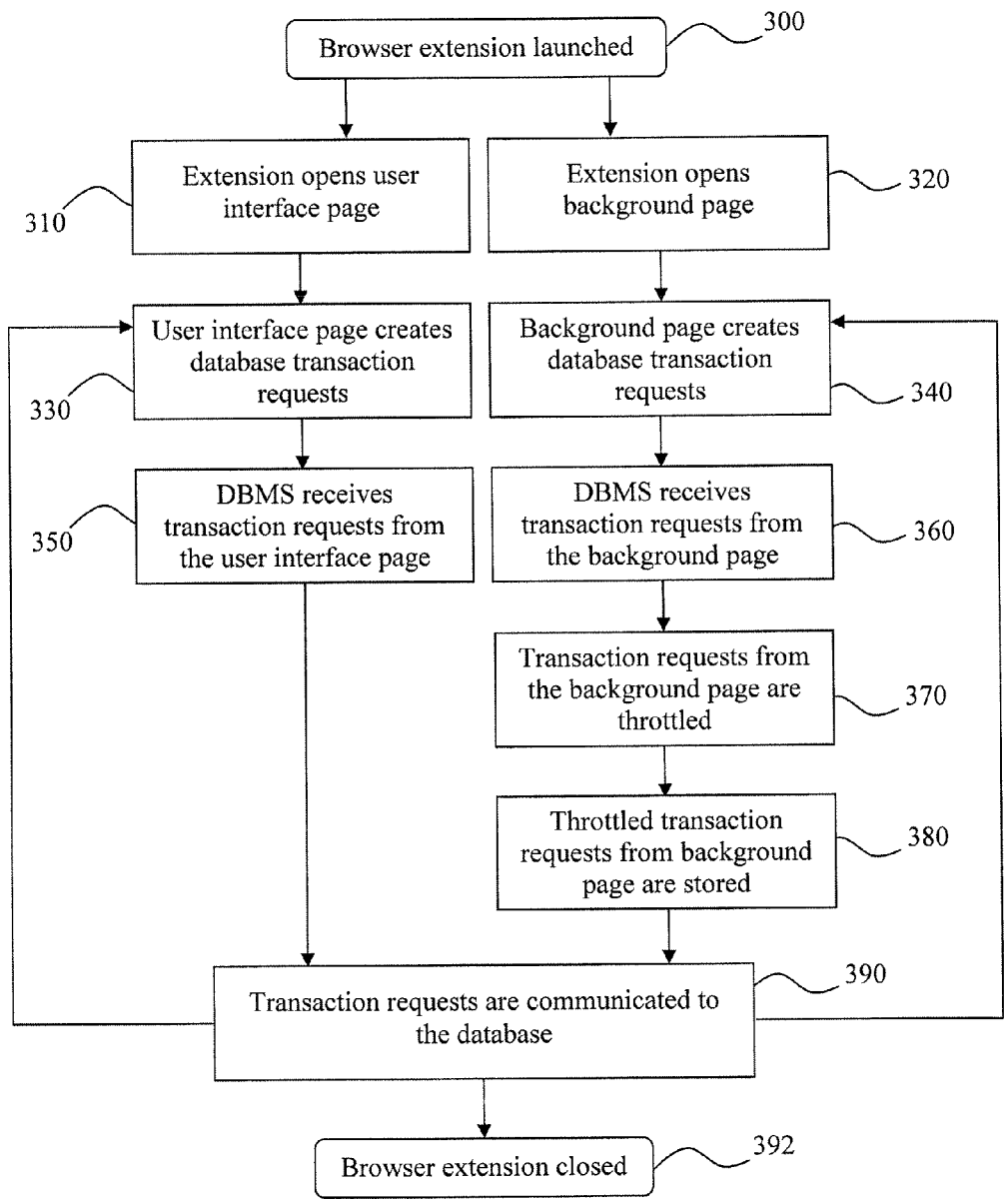
FIG. 3 is a flow chart of an example process for operating a database transaction management system in accordance with an example embodiment.

Reference is now made to FIGS. 2 and 3 which illustrate methods for managing database transaction requests from foreground and background pages. FIG. 2, for example, illustrates a high-level overview of a process for managing database transaction requests from foreground and background pages. At step 200 of the example method shown in FIG. 2, the database management system ("DBMS"), which can be a component of user device 114, software or program component 120, or another component of system 110, receives one or more transaction requests from a foreground process or page such as a user interface page.

The database management system ("DBMS") is software or a program package that controls the creation, maintenance, and use of a database (which can be any collection of data, files, values, variables, functions, and/or other data structures or objects). The DBMS comprises means for controlling access to the data within the database, maintaining the integrity of that data, managing concurrency control, maintaining the security of the database, and facilitating the recovery of the database after failures. In an example embodiment, the DBMS allows different programs, or separate aspects of the same program, access the same database concurrently.

The database transaction is a unit of work completed within a database management system against a database. To maintain the consistency and stability of the database, every transaction is isolated from every other transaction. Examples of database transactions include, but are not limited to, reading data, writing data, and many other forms of data inquiries and manipulations.

The foreground and background page(s) of the example method can be, for example, a browser extension. Software components such as browser extensions often require a single, long-running script in order to manage a certain task or state. A background page, which can be an 'invisible' HTML page that runs in the extension process and holds the mail logic of the extension, can facilitate the extension's requirements. For most extensions, the background page exists for the lifetime of the extension (specifically, while the extension is running or active), and typically there is only one instance of the background page active for each extension, although this can vary depending upon the needs of the programmer or the extension.

According to one embodiment, in an extension with a background page, the UI—for example, the browser action or page action and any options page—is implemented by dumb views. When the view needs some state, it requests the state from the background page. When the background page notices a state change, the background page tells the views to update.

Thus, the background page can communicate with other pages such as the foreground page using, for example, script calls, similar to how frames can communicate. However, other methods of communication are also possible. One method of interacting with other pages is to use a content script, which is a piece of JavaScript that executes in the context of a page that's been loaded into the browser. Content scripts can, for example, read details of the web pages the browser visits, and they can make changes to the pages.

One example of a browser extension with an ever-functioning background page is a "mail checker." The extension—via the background page—is always working in the background by periodically checking for new email messages. Thus, the background page communicates in the background with a server or other location to send an inquiry into whether there are any new email messages that have been received by the server.

Prior to, simultaneously with, or after receiving the transaction request(s) from the foreground page at step 200, the DBMS receives one or more transaction requests from a background process or page. In the example provided above, the background page request can be an inquiry regarding new emails, such as a request to write an email—such as a newly-received email or an older email for archiving—to the database in the background while the user is perusing the inbox.

Traditionally, the DBMS would process the transactions in the order they are received by the system. If the background process or page has sent 25 transactions that are now being processed by the DBMS, and the foreground page sends a single transaction request, that single foreground transaction request is forced to wait behind the 25 pending and queued background transactions. This can result in significant delay to the user, thereby interrupting the user's experience.

At step 230 of the method, the database transaction requests from the background process or page are "throttled." According to one embodiment, the throttling is accomplished by diverting all transaction requests from the one or more background processes or pages to an in-memory queue, as shown at step 240 of the method in FIG. 2. The queue can be a simple, linear, "First-In-First-Out" ("FIFO") data structure in which the first database transaction request added to the queue is the first database transaction request processed by the DBMS (and therefore sent to the database for execution), and the last database transaction request added to the queue is the last database transaction request processed by the DBMS. The in-memory queue can be established, maintained, and managed using any of the well-known methods already known in the art.

Once stored in the queue, the background database transactions are processed by the DBMS and sent to the database at step 220. Accordingly, the queue and the DBMS must be in wired or wireless communication. In an example embodiment, the background database transaction requests can only be sent to the database by the DBMS one at a time. This is accomplished, for example, by modifying the DBMS to only retrieve one background database transaction request from the in-queue memory at a time for submission to the database, or by configuring the in-queue memory to only submit one background database transaction at a time to the DBMS. According to the later embodiment, the DBMS will only perceive and process a single background database transaction at any one time regardless of the number of pending transactions in the queue.

According to another embodiment, the one or more background processes are allowed to submit only a limited, predetermined number of transactions to either the in-queue memory or the DBMS, and those transactions must first be completed before another limited, predetermined number of transactions can be submitted to the in-queue memory or the DBMS.

According to an example embodiment of the method shown in FIG. 2, the one or more foreground processes can submit an unlimited number of transactions to the database while the background transaction(s) are throttled using one or more of the throttling techniques described herein. If, for example, the background processes can only submit one background transaction to the in-queue memory, the DBMS, and/or the database at a time, the foreground process will not have to wait in line for more than the one background process database transaction, thereby resulting in lower latency and avoiding or ameliorating delays to the user.

According to another embodiment, the level of priority given to foreground and background processes can be adjusted by adjusting the number of transactions each process can be allowed to submit to the local database at any one time. For example, a process with a direct impact on user delays can be allowed to submit an unlimited number of transactions, while a process that only marginally affects user delays can be allowed to submit a limited number of transactions. In this way, the designer or user is able to easily designate the priority of any process by adjusting the number of transactions that process can submit to the database at once. Further, the level of priority given to foreground and background processes can be dynamically adjusted to meet the needs of the system or the user. For example, if the system or the user's activity changes such that the queued background transaction requests should be processed immediately to avoid latency, the number of background transactions that the in-queue memory or DBMS can have outstanding in the database at any one time can be increased either by a predetermined amount or by an amount determined by the system or monitoring component to be sufficient to alleviate the impending or current latency. Alternatively, the throttle can be temporarily or permanently alleviated or otherwise modified.

Example Database Management Method Using a Browser Extension

Reference is now made to FIG. 3 which illustrates an example method for managing database transaction requests from foreground and background pages of a software component such as a browser extension. As described above, software components such as browser extensions often require a single, long-running script in order to manage a certain task or state. A background page, which can be an 'invisible' HTML page that runs in the extension process and holds the mail logic of the extension, can facilitate the extension's requirements. For most extensions, the background page exists for the lifetime of the extension (specifically, while the extension is running or active), and typically there is only one instance of the background page active for each extension, although this can vary depending upon the needs of the programmer or the extension. One example of a browser extension with an ever-functioning background page is a mail checker which is constantly or periodically working in the background by periodically checking for new email messages. This is just one example, however, and there are thousands more extensions which are currently known, with hundreds or thousands of new extensions being developed annually.

At step 300 of the example method shown in FIG. 2, a browser extension is launched using any of the well-known methods in the art. For example, the browser extension may be launched automatically upon launching the browser, or the extension may be launched by a user or system action following the opening of the browser. Once the browser extension is launched, it opens a foreground page or process at step 310 (such as a user interface page), and/or opens a background page at step 320. At step 330, the foreground page or process creates one or more database transaction requests, perhaps resulting from an automatic process or some action initiated, completed, or otherwise affected by a user or a system with sufficient access or influence. The foreground database transaction request is then sent to the DBMS at step 350. The DBMS, which can be a component of user device 114, software or program component 120, or another component of system 110, receives one or more transaction requests from a foreground process or page such as a user interface page.

The foreground database transactions are processed by the DBMS and sent to the database at step 390. According to an example embodiment of the method shown in FIG. 3, the foreground process submits an unlimited number of transactions to the database without experience any throttling or other limiting effect or process by either the system or the DBMS.

Prior to, simultaneously with, or after receiving the transaction request(s) from the foreground page, the background page or process creates one or more database transaction requests at step 340, perhaps resulting from an automatic process or some action initiated, completed, or otherwise affected by a user or a system with sufficient access or influence. The background transaction request(s) are then sent to the DBMS at step 360.

At step 370 of the method, the database transaction request(s) from the background process or page are "throttled." According to one embodiment, the throttling is accomplished by diverting all transaction requests from the one or more background processes or pages to an in-memory queue, as shown at step 380 of the method in FIG. 3. As described above, the queue can be a simple, linear, FIFO data structure in which the first database transaction request added to the queue is the first database transaction request processed by the DBMS (and therefore sent to the database for execution), and the last database transaction request added to the queue is the last database transaction request processed by the DBMS, although other types of in-queue memory are possible, and other methods of throttling the flow of transaction requests from the background page or process are possible. The in-memory queue can be established, maintained, and managed using any of the well-known methods already known in the art.

Once stored in the queue, the background database transactions are processed by the DBMS and sent to the database at step 390. Accordingly, the queue and the DBMS must be in wired or wireless communication. In an example embodiment, the background database transaction requests can only be sent to the database by the DBMS one at a time. This is accomplished, for example, by modifying the DBMS to only retrieve one background database transaction request from the in-queue memory at a time for submission to the database, or by configuring the in-queue memory to only submit one background database transaction at a time to the DBMS. According to the later embodiment, the DBMS will only perceive and process a single background database transaction at any one time regardless of the number of pending transactions in the queue. If the background process can only submit one background transaction to the in-queue memory, the DBMS, and/or the database at a time, the foreground process will not have to wait in line for more than the one background process database transaction, thereby resulting in lower latency and avoiding or ameliorating delays to the user.

According to another embodiment of the method shown in FIG. 3, the level of priority given to the foreground process and the background can be adjusted by adjusting the number of transactions each process can be allowed to submit to the local database at any one time. For example, a process with a direct impact on user delays can be allowed to submit an unlimited number of transactions, while a process that only marginally affects user delays can be allowed to submit a limited number of transactions. In this way, the designer or user is able to easily designate the priority of any process by adjusting the number of transactions that process can submit to the database at once. Further, the level of priority given to foreground and background process can be dynamically adjusted to meet the needs of the system or the user. For example, if the system or the user's activity changes such that the queued background transaction requests should be processed immediately to avoid latency, the number of background transactions that the in-queue memory or DBMS can have outstanding in the database at any one time can be increased either by a predetermined amount or by an amount determined by the system or monitoring component to be sufficient to alleviate the impending or current latency. Alternatively, the throttle can be temporarily or permanently alleviated or otherwise modified.

Although the present invention has been described in connection with example embodiments, it should be understood that modifications, alterations, and additions can be made to the invention without departing from the scope of the invention as defined by the claims.

What is claimed is:

1. A method comprising:
receiving, at a database management system, at least one database transaction from a first script of a software application;
assigning a first priority level to each of the at least one database transactions from the first script communicating, by the database management system at the first priority level, the at least one database transaction from the first script to a local database managed by the database management system;
receiving, at the database management system, at least one database transaction from a second script of the software application;
assigning a second priority level to each of the at least one database transactions from the second script, wherein the second priority level depends on and is different from the first priority;
storing the at least one database transaction received from the second script; and
communicating, by the database management system at the second priority level, the stored database transactions of the second script to the database in a quantity of the communicated stored database transactions at or below a predetermined maximum number wherein the predetermined maximum number of stored database transactions sent to the database depends on the second priority level.

2. The method of claim 1, wherein the first script is a foreground script, and the second script is a background script.

3. The method of claim 1, wherein the database transactions communicated from the first script to the database and the second script to the database from a first-in-first-out queue at the database.

4. The method of claim 3, wherein the transactions communicated from the foreground script to the database are never behind more than the predetermined maximum number of database transactions from the background script in the first-in-first-out queue.

5. The method of claim 1, wherein the software application is a browser-based software application.

6. The method of claim 5, wherein the browser-based software application is a browser extension.

7. The method of claim 1, wherein the first script of the software application is running in a foreground page, and the second script of the software application is running in a background page.

8. The method of 7, wherein the background page of the software application is a page other than a user interface page.

9. The method of claim 1, wherein the predetermined number is one.

10. The method of claim 1, wherein an unlimited number of database transactions from the first script of the software application are communicated to the database by the database management system.

11. The method of claim 1, further comprising the step of communicating with a remote server, wherein at least one of said background transaction requests is a request to synchronize data between the remote server and said database.

12. A database management method for managing a plurality of database transactions from a browser-based software application to a local database, the method comprising:
  receiving, at a database management system, at least one database transaction from a foreground page of a software application;
  assigning a foreground priority to each database transaction from the foreground page;
  communicating, by the database management system, the at least one database transaction from the foreground page to a database managed by the database management system;
  receiving, at the database management system, at least one database transaction from a background page of the software application;
  assigning a background priority to each database transaction from the background page, wherein said background priority depends on said foreground priority;
  storing the at least one database transaction received from the background page in a local memory; and
  communicating, by the database management system, the stored database transactions to the database, wherein the stored database transactions are communicated by the database management system to the database in a quantity at or below a predetermined maximum number, and further wherein the predetermined maximum number of stored database transactions sent to the database depends on the assigned background priority;
  wherein the database transactions communicated from the foreground page to the database and the background page to the database from a first-in-first-out queue at the database.

13. The database management method of claim 12, wherein the transactions communicated from the foreground page to the database are never behind more than the predetermined maximum number of database transactions from the background page in the first-in-first-out queue.

14. The database management method of claim 12, further comprising the step of communicating with a remote server, wherein at least one of said background transaction requests is a request to synchronize data between the remote server and said database.

15. A non-transitory computer readable storage medium containing program code comprising:
  program code for receiving, at a database management system, at least one database transaction from a first script of a software application;
  program code for assigning a first priority level to each of the at least one database transactions from the first script;
  program code for communicating, by the database management system at the first priority level, the at least one database transaction from the first script to a local database managed by the database management system;
  program code for receiving, at the database management system, at least one database transaction from a second script of the software application;
  program code for assigning a second priority level to each of the at least one database transactions from the second script, wherein the second priority level depends on and is different from the first priority level;
  program code for storing the at least one database transaction received from the second script; and
  program code for communicating, by the database management system at the second priority level, the stored database transactions of the second script to the database, wherein the stored database transactions are communicated by the database management system to the database in a quantity at or below a predetermined maximum number, which depends on the second priority level, and further wherein the database transactions communicated from the first script to the database and the second script to the database from a first-in-first-out queue at the database.

16. The computer-readable storage medium of claim 15, wherein an unlimited number of database transactions from the first script of the software application are communicated to the database by the database management system.

17. The computer-readable storage medium of claim 15, further comprising program code for communicating with a remote server, wherein at least one of said background transaction requests is a request to synchronize data between the remote server and said database.

18. A system for managing a plurality of database transactions from a software application to a local database, the system comprising:
  a user computer;
  a software application comprising a first application process and a second application process;
  a local database;
  a database management system, wherein said database management system receives at least one database transaction from said first application process and at least one database transaction from said second application process, wherein said database management system assigns a first priority level to each of the at least on database transactions from said first application process and a second priority level, which depends on and is different from the first priority level, to each of the at least one database transaction from said second application process, and further wherein said database management system communicates said at least one database transaction from said first application process at the first priority level and said at least one database transaction from said second application process at the second priority level to said database;

wherein said second application process database transactions are communicated by the database management system to the database in a quantity at or below a predetermined maximum number, which depends on the second priority level.

19. The system of claim 18, further comprising:
 a local memory, wherein said database management system stores the received database transactions from said second application process in said local memory.

20. The system of claim 18, wherein the database transactions communicated from the first application process to the database and the second application process to the database from a first-in-first-out queue at the database.

21. The system of claim 20, wherein the transactions communicated from the first application process to the database are never behind more than the predetermined maximum number of database transactions from the second application process in the first-in-first-out queue.

22. The system of claim 18, further comprising:
 a remote server;
 wherein at least one of said second application process transaction requests is a request to synchronize data between the remote server and said database.

* * * * *